J. L. CHESNUTT.
BALL BEARING STRING PROOF WHEEL.
APPLICATION FILED APR. 29, 1921.

1,392,912.

Patented Oct. 11, 1921.

INVENTOR:
J. L. CHESNUTT
By Earl M. Sinclair
Att'y.

UNITED STATES PATENT OFFICE.

JOHN LOUCIEN CHESNUTT, OF LONG BEACH, CALIFORNIA.

BALL-BEARING STRING-PROOF WHEEL.

1,392,912.     Specification of Letters Patent.     Patented Oct. 11, 1921.

Application filed April 29, 1921. Serial No. 465,587.

*To all whom it may concern:*

Be it known that I, JOHN LOUCIEN CHESNUTT, a citizen of the United States of America, and resident of Long Beach, Los Angeles county, California, have invented a new and useful Ball-Bearing String-Proof Wheel, of which the following is a specification.

The object of this invention is to provide an improved construction for a ball-bearing string-proof wheel especially designed for use on swivel casters and the like.

A further object of this invention is to provide an efficient, easy running wheel which is inexpensive to manufacture and assemble.

A further object of this invention is to provide an improved construction for an anti-friction wheel so constructed as to prevent the entrance of dirt and other foreign substances to the working parts.

A further object of this invention is to provide a ball-bearing wheel which is readily separable to facilitate repairs and replacement of worn or broken parts.

A further object of this invention is to provide a ball-bearing wheel provided with means for constant lubrication over a long period of time, thus facilitating its movement and increasing its life.

With these and other objects in view, my invention consists in the construction, arrangement and combination of elements hereinafter set forth, pointed out in my claims and illustrated by the accompanying drawing, in which—

Figure 1:
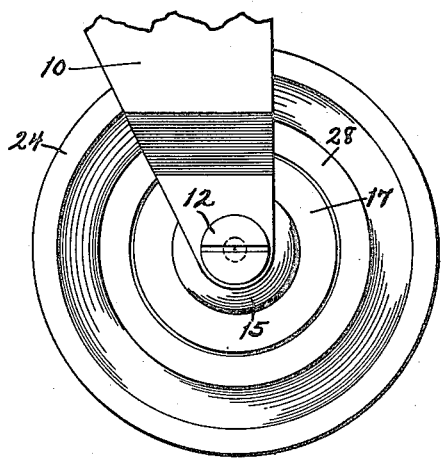
Figure 2:
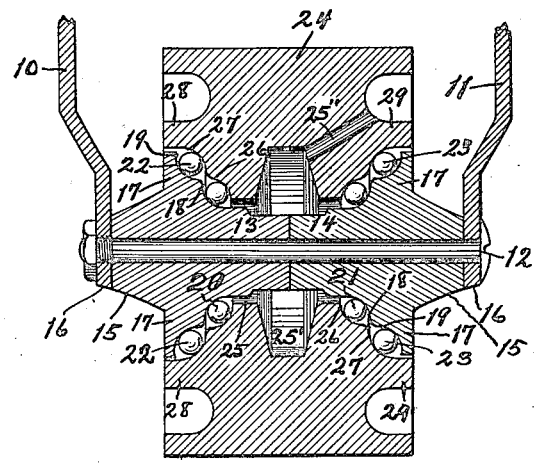

Figure 1 is a side elevation of my improved wheel. Fig. 2 is a vertical section of the same at right angles to Fig. 1.

In the construction of the device as shown the numerals 10, 11 designate spaced parallel wings or fork members of a wheel yoke, which may be of any desired construction. The wings 10, 11 preferably taper toward their lower ends and are apertured to receive a bolt 12 and one of said wings preferably is tapped to receive said bolt, a lock nut 12' being threaded on said bolt outside of and in contact with said wing. Mounted on the bolt 12 and entirely filling the space between the wings 10, 11 are mating axle members 13, 14, arranged end to end and having plane contacting faces in a vertical plane on the median line of the fork midway between the wings 10, 11; and said axle members are firmly, securely and rigidly held, against rotation, by the bolt 12 and its threaded relation to one of said wings as above set forth, so that the wings, bolt and axle members, when assembled, comprise a rigid and relatively immovable structure. The inner end portions of the axle members 13, 14 are cylindrical and the outer end portions thereof are tapering, at 15, the lower surfaces thereof extending upwardly and outwardly on oblique lines toward the lower ends of the wings 10, 11. The lower ends of the wings 10, 11 preferably are beveled, at 16, forming continuations of the tapered portions 15, so that a smooth surface is presented, likewise the head of the bolt 12 may merge into this taper as shown in Fig. 2. Each axle member 13, 14 is formed, between its cylindrical and tapered portions, with an outstanding annular flange 17, is preferably of varying diameters and is formed on its inner side, or the side adjacent the cylindrical portion of the axle member, with an arcuate or concaved face forming a ball race 18. The inner side of a wider portion of each flange 17 is formed with an arcuate or concaved face forming a ball race 19 of greater diameter than the race 18. A series of bearing balls 20 is mounted in the inner race 18 of the axle member 13 and a series of bearing balls 21 in the inner race 18 of the axle member 14, said balls traveling on the cylindrical portions of the axle members and in contact with the concaved faces forming the races referred to. A series 22 of bearing balls is mounted in the outer or larger race 19 of the axle member 13, and a series 23 in the outer or larger race 19 of the member 14.

An annular tread member 24 is provided and is mounted concentrically on and for rotation relative to the axle members 13, 14, said tread member being formed with a central bore 25 of slightly greater diameter than the cylindrical portions of said axle members. The bore 25 is enlarged at its end portions to receive the flanges 17 of the axle members 13, 14 and each of said enlarged portions is formed on one or more arcuate or concaved faces to provide raceways, in this instance two in number on each side and designated by the numerals 26, 27 respectively, coacting with the raceways 18, 19 and having rolling contact with the balls 20 and 22 on the one side and with the balls 21 and 23 on the other side. Thus the annular tread member 24 has an anti-friction bearing on the stationary axle members 13, 14, with one or more rows of bearing balls on each side of its center. As shown the outermost row of balls is of materially larger diameter than the innermost row. The balls 20, 21, 22, 23 are arranged to carry the load on oblique lines of approximately forty-five degrees to the vertical and thus counteract end thrust and play as well. It is obvious that in narrow wheels a single row of balls may be employed on each side of the center, and that in wheels of wider and larger construction the number may be increased as desired by providing the necessary coacting raceways in the flanges 17 and bore of the tread member.

The bore 25 of the tread member may be enlarged at the central part of the wheel to form an annular cavity 25' to receive a quantity of lubricating grease, which may be introduced by an oblique channel 25'' communicating with the side of the tread member. This enlargement also serves to lighten the tread member.

At the ends of its bore the tread member 24 is formed with outwardly extending flanges 28, 29 overhanging and slightly spaced from, and arranged substantially at right angles to, the flanges 17 of the axle members 13 and 14 respectively. The outer ends of the flanges 28, 29 are substantially in the vertical planes of the outer faces of the flanges 17, thus preventing the entrance of dirt and other foreign substances to the interior of the wheel and to the raceways and anti-friction devices therein. This construction also prevents the entrance of strings and threads, which often cause much trouble in wheels traveling over surfaces where they are prevalent, being drawn tight on the axle between the hubs of the wheel and the forks in such manner as to bind and retard or altogether prevent revolving of the wheel.

The tapering construction of the axle members between the wheel and the wings of the fork, together with the blending of these parts into the lower ends of the wings and bolt head, also contributes to the anti-string or string-proof feature of the device. A string or thread picked up by the tread of the wheel will slide off and wrap around the tapered portion 15 of an axle member at one side, then slip off and up around the bolt head or nut and be wrapped around the adjacent wing in further travel of the device, from which position it can be cut or otherwise easily removed at convenience and not in any way affect the functioning of the wheel.

The strings and threads so picked up cannot enter the interior of the wheel on account of the overhanging relation of the flanges 28, 29 relative to the flanges 17, and the narrowness of the space between said flanges.

The annular tread member may be formed of any desired and suitable material, or may be faced on its tread if desired with a material having superior wear-resisting qualities, or of a character to eliminate noise in use.

I claim as my invention—

1. A device of the class described, comprising spaced wings, axle members mounted end to end between said wings, a securing member extending through said axle members and wings and binding them rigidly together, an annular tread member rotatably mounted on said axle members, anti-friction devices between said axle members and the tread member, said axle members being formed with outstanding flanges between their ends, said tread member being formed with laterally extending flanges at its opposite sides overhanging and slightly spaced from said outstanding flanges.

2. A device of the class described, comprising spaced wings, axle members mounted end to end between said wings, a securing member extending through said axle members and wings and binding them rigidly together, an annular tread member rotatably mounted on said axle members, and anti-friction devices between said axle members and the tread member, said axle members being formed with outstanding flanges between their ends, said tread member being formed with laterally extending flanges at its opposite ends overhanging and slightly spaced from the outstanding flanges, said axle members being formed tapering from said outstanding flanges to their outer ends and merging into the lower ends of said wings.

3. A device of the class described, comprising spaced wings, axle members mounted end to end between said wings, a securing member extending through said axle members and wings and binding them rigidly together, said axle members being formed with cylindrical portions at their inner ends and with outstanding flanges beyond such cylindrical portions, a tread member of annular form rotatably mounted on said axle members and having a bore slightly larger than the cylindrical portions of said members and also enlarged at its ends to receive said outstanding flanges, each of said axle members being grooved between its cylindrical portion and flange to form ball races the outermost of which is of greater diameter than the others, the enlarged portions of the bore of said tread member also being grooved to form raceways coacting with the races of said axle members, and a series of bearing balls mounted in each of said races.

4. A device of the class described, comprising spaced wings, axle members mounted end to end between said wings, a securing member extending through said axle members and wings and binding them rigidly together, said axle members being formed with cylindrical portions at their inner ends and with outstanding flanges beyond such cylindrical portions, a tread member of annular form rotatably mounted on said axle members and having a bore slightly larger than the cylindrical portions thereof and also enlarged at its ends to receive said outstanding flanges, each of said axle members being grooved between its cylindrical portion and flange to form ball races the outermost of which is of greater diameter than the others, the enlarged portions of the bore of said tread member also being grooved to form races coacting with the races of said axle members, and a series of bearing balls mounted in each of said races, said tread member also being formed at each side with a laterally directed flange overhanging the outstanding flange of the adjacent axle member and slightly spaced therefrom.

Signed at Des Moines, in the county of Polk and State of Iowa, this 8" day of April, 1921.

JOHN LOUCIEN CHESNUTT.